United States Patent [19]

Shono et al.

[11] 4,380,462
[45] Apr. 19, 1983

[54] GLASS FIBER APPARATUS AND METHOD

[75] Inventors: Hiroaki Shono; Toshio Noji; Shinzo Ishikawa, all of Fukushima, Japan

[73] Assignee: Nitto Boseki Co., Ltd., Fukushima, Japan

[21] Appl. No.: 204,577

[22] Filed: Nov. 6, 1980

Related U.S. Application Data

[63] Continuation of Ser. No. 35,447, May 3, 1979, abandoned.

[30] Foreign Application Priority Data

May 8, 1978 [JP] Japan ............................ 53-54192
May 9, 1978 [JP] Japan ............................ 53-54801

[51] Int. Cl.³ .......................................... C03B 37/025
[52] U.S. Cl. ........................................... 65/1; 65/2; 65/12
[58] Field of Search ........................... 65/1, 2, 12

[56] References Cited

U.S. PATENT DOCUMENTS

| | | | |
|---|---|---|---|
| 2,234,986 | 3/1941 | Slayter et al. | 65/1 X |
| 2,291,289 | 7/1942 | Slayter et al. | 65/12 |
| 2,335,135 | 11/1943 | Staelin | 65/2 |
| 2,775,850 | 1/1957 | Stalego | 49/55 |
| 2,821,744 | 9/1958 | Spohn et al. | 425/72 |
| 3,150,946 | 9/1964 | Russell | 65/2 |
| 3,232,730 | 2/1966 | Drummond | 65/2 |
| 3,248,192 | 4/1966 | Miller | 65/5 |
| 3,256,078 | 6/1966 | Drummond | 65/2 |
| 3,257,181 | 9/1966 | Stalego | 65/12 |
| 3,275,720 | 9/1966 | Ohsol | 264/48 |
| 3,288,581 | 11/1966 | Schweppe | 65/2 |
| 3,311,688 | 3/1967 | Schuller | 264/176 F |
| 3,385,685 | 5/1968 | Zanaboni | 65/12 |
| 3,573,014 | 3/1971 | Strickland et al. | 65/1 |
| 3,574,581 | 4/1971 | Strickland et al. | 65/1 |
| 3,625,025 | 12/1971 | Jensen | 65/12 X |
| 3,672,857 | 6/1972 | Stalego | 65/12 |
| 3,829,301 | 8/1974 | Russel | 65/2 |
| 3,837,823 | 9/1974 | Shealy | 65/1 |
| 3,867,119 | 2/1975 | Kasuga et al. | 65/1 X |
| 3,905,790 | 9/1975 | Strickland | 65/12 X |
| 3,969,099 | 7/1976 | Reese | 65/12 X |
| 3,979,195 | 9/1976 | Strickland | 65/1 |
| 4,032,314 | 6/1977 | Coggin | 65/1 |
| 4,033,742 | 7/1977 | Nichols et al. | 65/2 |
| 4,118,210 | 10/1978 | Watanabe et al. | 65/12 X |
| 4,159,198 | 6/1979 | Wakasa et al. | 65/1 |
| 4,222,757 | 9/1980 | Glaser | 65/1 X |

FOREIGN PATENT DOCUMENTS

| | | |
|---|---|---|
| 2644908 | 5/1977 | Fed. Rep. of Germany . |
| 2727969 | 5/1977 | France . |
| 51-7218 | 1/1976 | Japan . |
| 1544381 | 4/1979 | United Kingdom . |
| 533552 | 10/1976 | U.S.S.R. . |

*Primary Examiner*—Robert L. Lindsay, Jr.
*Attorney, Agent, or Firm*—Wegner & Bretschneider

[57] ABSTRACT

An apparatus and method for manufacturing glass fibers are provided. The apparatus comprises means for containing a head of glass; an orifice plate having a large number of orifices arranged in flooding relationship, each of said orifices being provided on a projection or tip extending downwardly from said orifice plate; and means disposed below said orifice plate and being in communication with a gas supply for directing air upwardly to the undersurface of said orifice plate to cool the cones of glass formed at each projection or tip, said air impinging upon said orifice plate.

12 Claims, 6 Drawing Figures

GLASS FIBER APPARATUS AND METHOD

CROSS REFERENCE TO RELATED CASE

This application is a continuation of our copending application, Ser. No. 35,447, filed May 3, 1979 now abandoned, which in turn claims priority under 35 USC §119 based upon our Japanese application Nos. 54,192/78, filed May 8, 1978, and 54,801/78, filed May 9, 1978.

BACKGROUND OF THE INVENTION

This invention is directed to an improvement in the Strickland "bulk air" invention set forth in U.S. Pat. No. 3,905,790 ("Strickland patent") which discloses the preparation of fibers of glass by drawing molten glass through an orifice plate. The description of the "bulk air" system of the Strickland patent is incorporated herein by reference. The Strickland "bulk air" invention contemplates passing separate streams of molten glass formed at each orifice, while directing a bulk flow of rapidly moving gas upwardly to the orifice area of the orifice plate, this bulk flow constituting a generally single gas column at the cone and plate area of the orifice plate. This Strickland "bulk air" flow cools the cones of glass to provide a stable cone formation and to maintain a separation of cones thereby preventing flooding. With a flow of bulk air upward to the orifice plate even with a relatively diminished volume of air less than in the preferred embodiments of the Strickland patent, it is believed that such bulk air impinges on the orifice plate to eliminate stagnant gas adjacent the orifice plate, with the gas moving outwardly in all directions from the orifice area. The Strickland bulk air also supplies a source of gas sucked downwardly by the fibers as they are attentuated from below, the bulk air substantially eliminating ambient gas drawn into the region of the fiber cones. Any mechanical arrangement may be used to provide the bulk air, it being important that when the air reaches the cone area of the orifice plate, it arrives as a generally single upwardly moving air column. Various mechanical arrangements for providing such bulk air are disclosed in detail in the Strickland patent.

The Strickland invention may also be described as providing a method of blowing air toward the undersurface of the orifice plate in countercurrent relationship to the glass fiber streams being drawn from the orifice plate. In accordance with this method, even when the orifice plate has such a high density of orifices as to cause the coalescence of adjacent molten glass cones and the resultant flooding of the undersurface of the orifice plate in the absence of the bulk air, the air blown against the undersurface of the orifice plate serves not only to cool the molten glass cones but also to expel gases stagnant around them. The strong cooling effect achieved by the Strickland "bulk air" invention avoids the need for cooling fins or cooling water circulation pipes, and permits an orifice density higher than that with previous tipped orifice plates. The orifice plate employed in the Strickland invention generally has a thickness of from 1.0 to 10 mm and 2,000 to 6,000 orifices. There is generally an orifice spacing of from 1.40 mm to 4.00 mm; such an orifice plate is referred to herein as a "closely spaced orifice plate".

SUMMARY OF THE INVENTION

An apparatus and process in accordance with the Strickland invention is provided, with the present invention comprising an improvement in the orifice plate. Although the shape of the orifice plate is not limited in the generic aspect of the Strickland patent, the Strickland preferred orifice plate is generally a flat orifice plate. The present invention within the scope of the Strickland patent provides an improved orifice plate that can be used in conjunction with the Strickland "bulk air" system to provide an improved method and apparatus for the manufacture of glass fibers.

In a first aspect of the present invention, there is provided a method of forming glass fibers which comprises drawing streams of molten glass through an orifice plate having a large number of orifices arranged in flooding relationship, each of said orifices being provided on a projection or tip extending downwardly from said orifice plate; and directing air upwardly to the undersurface of said orifice plate to cool the cones of glass formed at each projection or tip, said air impinging upon said orifice plate.

In accordance with a second aspect of the present invention there is provided an apparatus for manufacturing glass fibers which comprises means for containing a head of glass; an orifice plate having a large number of orifices arranged in flooding relatinship, each of said orifices being provided on a projection or tip extending downwardly from said orifice plate; and means disposed below said orifice plate and being in communication with a gas supply for directing air upwardly to the undersurface of said orifice plate to cool the cones of glass formed at each projection or tip, said air impinging upon said orifice plate.

By the term "in flooding relationship" it is understood that reference is made to an orifice plate having a large number of orifices so closely arranged that molten glass cones produced at adjacent orifices easily coalesce to cause flooding of the undersurface of the orifice plate in the absence of the bulk air of the Strickland invention.

As means for containing head of glass are contemplated the conventional such means as set forth in the Strickland patent, incorporated herein by reference. As said means disposed below the orifice plate and in communicatin with a gas supply are contemplated any type of mechanical arrangement that will supply air which, when it reahes the cone area of the orifice plate, provides an air flow upwardly to the orifice plate to cool the cones of glass formed at each projection or tip and which air impinges upon the orifice plate. The various mechanical arrangements for providing bulk air as disclosed in the Strickland patent are suitable as the present said means disposed below said orifice plate, and are incorporated herein by reference.

By projection or tip, it is understood that in the generic aspect of the present invention the glass be drawn from individual orifices each being completely surrounded by a depressed area, thus the word "projection" or "tip" being interchangeably used hereinafter to describe the generic aspect of the present invention. In accordance with a preferred embodiment, the distance from the depth of the projection to the orifice plate is from 0.4 mm to 4.0 mm. In a further embodiment, each tip is a prism. In a further embodiment, sets of parallel grooves in intersecting relationship are provided at right anels to each other whereby each tip is a square prism surrounded by such grooves. In a further enbodiment, each groove produced by said grooving has a cross section of 0.3 mm to 3.0 mm in width. In a further embodiment, the center-to-center distance between orifices is from 1.4 mm to 4.0 mm. Various modifications in a grooved orifice plate are contemplated. For example, three sets of parallel grooves may be arranged to intersect with one another at an angle of 60° to form triangular prisms.

It should be noted that when flooding occurs the separation of glass into individual cones is facilitated through the projection or tip orifice plate of the present invention.

DETAILED DESCRIPTION OF THE INVENTION

Figure 1:
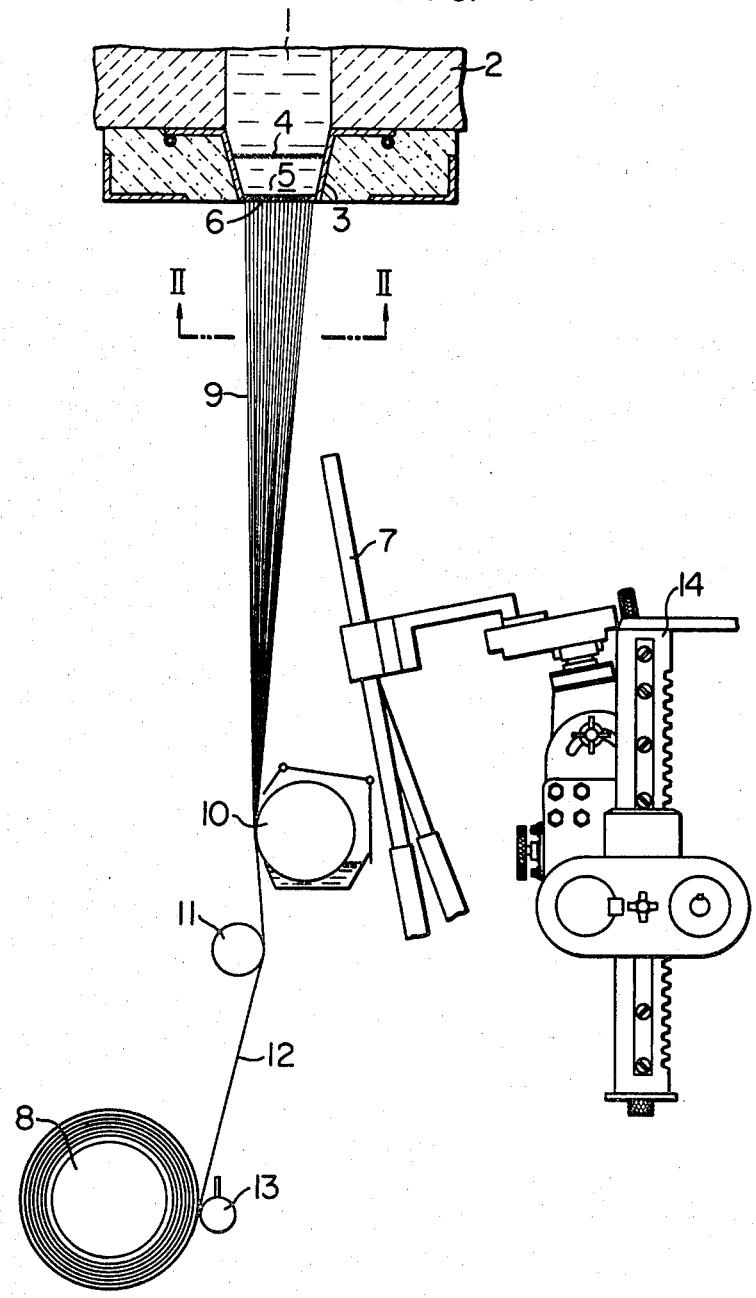
FIG. 1 is a schematic view of a glass fiber drawing apparatus incorporating an orifice plate in accordance with the present invention.

FIG. 1 shows an apparatus for drawing glass fibers of the present invention. High temperature molten glass 1 which is remelted and refined in a fore-hearth flows through an opening in a refractory 2 and a screen 4 into a bushing 3. A low-voltage current passes through the bushing 3 at a high flow rate in order to heat the bushing and thus maintains the molten glass at a predetermined temperature. The temperature of the bushing 3 is always monitored by a suitable temperature sensor (not shown) in order to maintain feedback control of the electricity supplied to the bushing 3.

The molten glass flows through a number of orifices 6 formed in an orifice plate 5 which is mounted at the bottom of the bushing. The molten glass flows through the orifices 6 into the atmosphere and is formed into cones at the orifices on the undersurface of the orifice plate 5. A winder 8 applies a tension force to the cones that are formed, with the glass fibers being drawn through a binder application roller 10 and a gathering show 11 into a strand 12 which in turn is traversed by a traverse guide 13 and wound around the winder 8.

Figure 2:
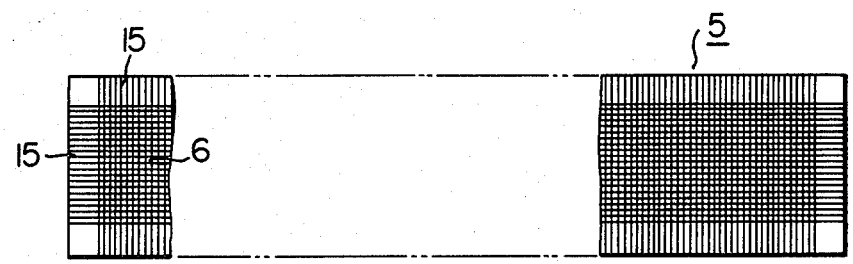
FIG. 2 is a bottom view taken in the direction indicated by the arrows II in FIG. 1 of the orifice plate.
Figure 3:
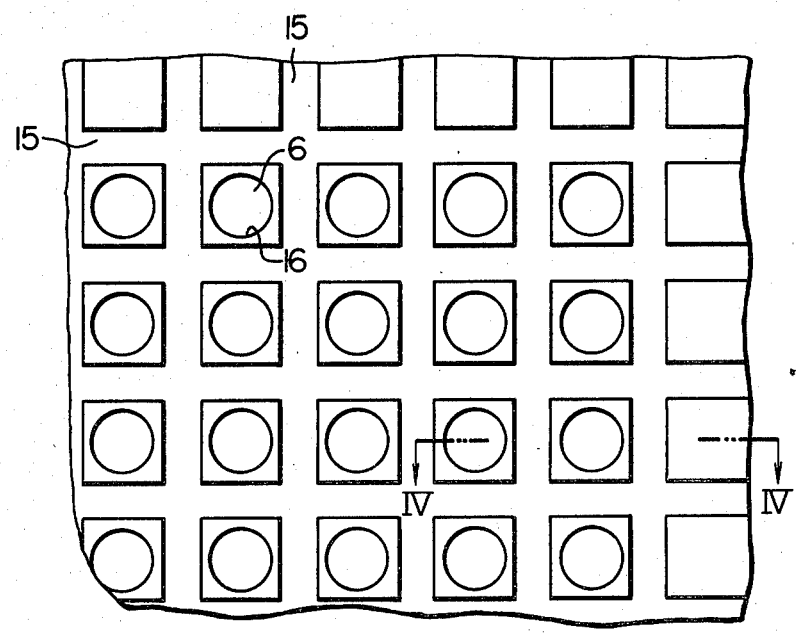
FIG. 3 is a fragmentary view of FIG. 2, on an enlarged scale.
Figure 4:
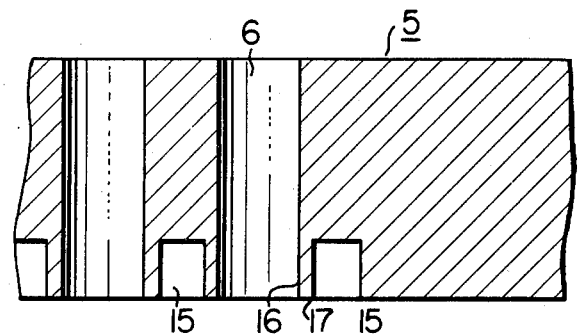
FIG. 4 is a sectional view taken along the line IV—IV of FIG. 3.
Figure 5:
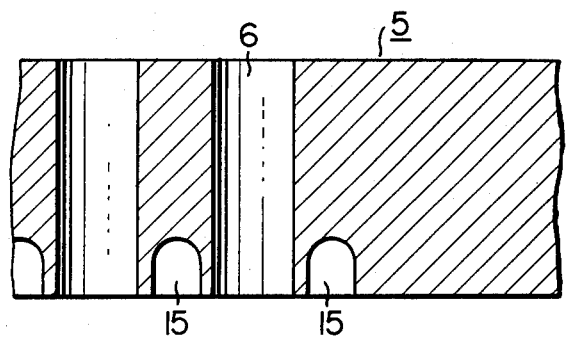
FIGS. 5 and 6 are views similar to that of FIG. 4 but illustrating further embodiments of the present invention.
Figure 6:
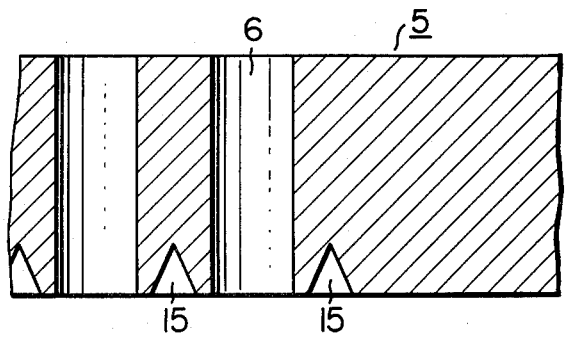

FIG. 2 is a bottom view of an embodiment of the orifice plate 5 in accordance with the present invention looking in the direction indicated by the arrow II—II in FIG. 1. The orifice plate 5 is made of a platinum alloy, such as a platinum-rhodium alloy or a platinum-gold-palladium alloy. The undersurface of the orifice plate 5 is formed with many longitudinal and transverse parallel grooves 15 which enclose each of the orifices 6 and thus the outlet 16 of each orifice 6 opens at the center of the lower end of a quadrangular prism as better shown in FIGS. 3 and 4. FIG. 4 shows the groove 15 as being rectangular in cross section. Alternatively, the groove may have an inverted U or V shaped cross-sectional configuration as shown in FIG. 5 or 6. The tip orifice plate of the present invention is conveniently provided in a simple manner by merely engraving grooves on the flat undersurface of an orifice plate.

According to the present invention, the outlet of the tip orifice is opened at the lower end, the tip in a preferred embodiment being a prism projection coaxially therefrom so that there may be attained the effects of a tip orifice. The fabrication steps for making such an orifice plate are relatively simple. Orifice plates with a higher degree of orifice density are thus readily provided. A further advantage is that the wall thickness of the tip orifices may be easily varied by varying the width of the grooves 15. The existence of four corners of the prism of the tip orifice of the present invention does not have adverse effects on the drawing of glass fibers, but is effective in dissipating heat. Although FIG. 2 shows grooves engraved throughout the orifice plate from its one end to the other end, it is to be noted that the above advantages of the present invention may be obtained by engraving the grooves only within the orifice area provided that one groove is always interposed between adjacent orifices. The grooves also may be diagonally arranged across the orifice plate according to the orifice arrangement.

According to the present invention, the orifice plate may be produced merely by engraving parallel grooves on the flat undersurface of the orifice plate, permitting an orifice density for the present tipped orifice plate higher than the prior art tip orifice plates. For example, the present invention may be readily applied to an orifice plate with a number of orifices from 2,000 to 6,000 arrayed in such a small spacing of 1.40 to 4.00 mm.

However, such a closely spaced orifice plate does not avoid the problem of the molten glass emerging from the outlet 16 of each orifice 6 and flowing over the surrounding edge 17 (See FIG. 4) of the lower end of the prism into the groove 15 and further spreading across the groove 15 to the adjacent prisms thereby causing flooding of molten glass over the undersurface of the orifice plate. In order to keep the molten glass emerging from all orifices in individual separate cones, therefore, it is also essential to blow air jets against the undersurface of the orifice plate in accordance with the method of the Strickland patent.

As shown in FIG. 1, a row of air nozzles 7 for blowing air jets against the undersurface of the orifice plate 5 is mounted on a stand 14 which serves to adjust the air nozzles 7 in optimum position and at optimum angle. The volume of air jets to be impinged against the orifice plate of the present invention may be considerably decreased as compared with the case of a generally flat orifice plate without tips.

For a closely spaced orifice plate, satisfactory results are obtained using grooves 15 having a width from 0.3 to 3.0 mm and a depth from 0.4 to 4.0 mm. When the width of the grooves is smaller than 0.3 mm, the surface tension of molten glass overcomes the effect provided by the grooves 15 for separating the individual molten glass cones. For example, when a glass fiber being drawn from an orifice is broken, the molten glass emerging from the orifice associated with the broken fiber immediately spreads to the surrounding edge 17 to be formed into a droplet which immediately contacts and joins with the adjacent molten glass cone due to the strong surface tension of the molten glass droplet. When the width of the grooves 15 exceeds 3.0 mm, the orifice plate must have a relatively large orifice spacing and thus is not a "closely spaced orifice plate", which is defined as having an orifice spacing less than 4.0 mm. In this case, therefore, the molten glass cones may be kept separated from each other even without blowing air jets against the undersurface of the orifice plate.

When the depth is shallower than 0.4 mm, satisfactory separation of molten glass cones may be ensured when the orifice plate is comparatively new. However, after a long period of operation, the grooves 15 are deformed due to evaporation of the alloy forming the orifice plate. When the depth exceeds 4.00 mm, it becomes difficult to machine such deep grooves.

According to the present invention, the tendency of the molten glass cones to coalesce may be decreased. For this reason, the amount of cooling air for the tip orifice of the present invention may be considerably decreased.

Experiments were conducted with a tipped orifice plate of the present invention having 2,000 orifices separated by the grooves and the air jet pressure ranging from 5 mm to 15 mm $H_2O$. Subsequent testing has shown that with relatively deep grooves, an air jet pressure as low as 0.1 mm may be used. A flow rate as low as between 0.6 and 1.4 $m^3$/min was sufficient to maintain satisfactory glass fiber drawing operations. According to the present invention the volume of air required for cooling the orifice plate may be considerably decreased. Since the air cooling effects may be reduced as described above, the surface temperature of molten glass cones may be maintained at relatively high level so that the surface viscosity may be maintained at a relatively low level. As a result, air bubbles and/or striae may be dissipated from the surface and thus the smooth surface flaws may be eliminated. Consequently, filament breakage frequency is reduced. Separating molten glass into individual cones is facilitated when the glass fiber drawing operation is to be started or when the breakage of all fibers or filaments being drawn should occur. In general, the separation of molten glass emerging from the individual orifices is carried out in the following steps:

(1) The temperature of molten glass in the bushing is so controlled that it becomes 20° to 60° C. lower than the temperature of molten glass to be maintained during normal drawing operation. The purpose of this step is to decrease the wetting degree between the molten glass and the orifice plate.

(2) A viscous block of molten glass flooded over the undersurface of the orifice plate is gripped with a pincers and pulled down while air jets are blown against the undersurface of the orifice plate. In this way the separation of molten glass into individual glass fibers starts at a local area of the orifice plate to which the air jets are centralized.

(3) As the molten glass separation proceeds, the air jet volume is gradually increased while simultaneously gradually increasing the temperature of molten glass within the bushing.

(4) Finally a strong air jet issued from an air lance is blown against a part of molten glass which still remains coalesced at a local area of the undersurface of the orifice plate, thereby completing the separation.

During these steps it is unavoidable that a uniform temperature profile over the orifice plate cannot be maintained due to the facts that the electric current flowing through the bushing is changed so that there is produced a difference in the temperature variation between several local areas of the orifice plate and that the temperature at the area of the orifice plate at which molten glass emerging from orifices is separated into glass fibers is different from the temperature at the other area at which molten glass emerging from orifices still remains coalesced. This non-uniform temperature profile makes the molten glass emerging from high temperature orifices tends to coalesce while the molten glass emerging from the lower temperature orifices tends to solidify thereby clogging the orifices. With the orifice plate of the present invention, it may not be necessary to change the temperature of the bushing and the volume of air blown against the undersurface of the orifice plate during the molten glass separation steps; the separation may proceed over the whole undersurface of the orifice plate simultaneously. As a result, the separation may be accomplished in a relatively simple manner within a relatively short time so that fiber breakage monitoring may be eliminated and labor saved.

The following example illustrates the invention:

With an orifice plate having 2,000 orifices, comparatively large diameter glass fibers are drawn:

Orifice diameter: 1.20 mm
Thickness of orifice plate: 2.00 mm
orifice spacing: 2.30 mm
Width of grooves: 0.70 mm
Depth of grooves: 0.50 mm
Drawing speed: 900 g/min
Frequency of fiber breakage:
   23 microns in dia.—4.5 times/day
   17 microns in dia.—6.5 times/day
Separation time in flooding all over the orifice plate: 1.5 min
Number of bushings per operator: 10
Flor rate of cooling air: 1.1 $m^3$/min While the above testing was conducted with the preferred Strickland glass of "E" type, it has been subsequently recognized that "C" and other types of glass are suitable.

What is claimed is:

1. A method of forming glass fibers which comprises drawing streams of molten glass through an orifice plate having a large number of orifices arranged in flooding relationship, each of said orifices being provided on a separate projection extending downwardly from said orifice plate; and directing air upwardly to the undersurface of said orifice plate to cool the cones of glass formed at each projection, said air impinging upon said orifice plate.

2. A method of claim 1 wherein said projection has a height of from 0.4 mm to 4.0 mm.

3. A method of claim 2 wherein said projection is formed by grooving a generally flat orifice plate, each projection being surrounded by grooves.

4. A method of claim 3 wherein each projection is a square prism.

5. A method of claim 3 wherein each groove has a cross section width of 0.3 mm to 3.0 mm.

6. A method of claim 1 wherein the center-to-center distance between orifices is from 1.4 mm to 4.0 mm.

7. An apparatus for manufacturing glass fibers which comprises means for containing a head of glass; an orifice plate having a large number of orifices arranged in flooding relationship, each of said orifices being provided on a separate projection extending downwardly from said orifice plate; and means disposed below said orifice plate and being in communication with a gas supply for directing air upwardly to the undersurface of said orifice plate to cool the cones of glass formed at each projection, said air impinging upon said orifice plate.

8. An apparatus of claim 7 wherein said projection has a height of from 0.4 mm to 4.0 mm.

9. An apparatus of claim 8 wherein said projection is surrounded by grooves.

10. An apparatus of claim 9 wherein each projection is a square prism.

11. An apparatus of claim 9 wherein each groove has a cross section width of 0.3 mm to 3.0 mm.

12. An apparatus of claim 7 wherein the center-to-center distance between orifices is from 1.4 mm to 4.0 mm.

* * * * *